(12) United States Patent
Durand et al.

(10) Patent No.: US 8,347,549 B2
(45) Date of Patent: Jan. 8, 2013

(54) SYSTEM FOR TRAPPING FLYING INSECTS AND A METHOD FOR MAKING THE SAME

(75) Inventors: Emma A Durand, Jamestown, RI (US); Michael J Palombo, Warwick, RI (US)

(73) Assignee: Woodstream Corporation, Lititz, PA (US)

( * ) Notice: Subject to any disclaimer, the term of this patent is extended or adjusted under 35 U.S.C. 154(b) by 2073 days.

(21) Appl. No.: 10/686,815

(22) Filed: Oct. 17, 2003

(65) Prior Publication Data
US 2004/0139648 A1    Jul. 22, 2004

Related U.S. Application Data

(60) Provisional application No. 60/419,085, filed on Oct. 18, 2002.

(51) Int. Cl.
*A01M 1/06* (2006.01)
*A01M 1/02* (2006.01)

(52) U.S. Cl. .................................................. 43/139
(58) Field of Classification Search ............... 43/139, 43/125, 129
See application file for complete search history.

(56) References Cited

U.S. PATENT DOCUMENTS

| | | |
|---|---|---|
| 1,693,368 A | 11/1928 | Cherry |
| 2,470,564 A | 5/1949 | Lawrence, Jr. et al. |
| 2,818,110 A | 12/1957 | Rulseh |
| 2,893,161 A | 7/1959 | Reid |
| 2,938,577 A | 5/1960 | Hughey |
| 3,196,577 A | 7/1965 | Plunkett |
| 3,217,782 A | 11/1965 | Vosper |
| 3,381,896 A | 5/1968 | Winters |
| 3,852,042 A | 12/1974 | Wagner |
| 4,215,549 A | 8/1980 | Daeschner |
| 4,265,611 A | 5/1981 | Reed et al. |
| 4,421,095 A | 12/1983 | Kreis |
| 4,424,017 A | 1/1984 | Okigami et al. |
| 4,506,473 A | 3/1985 | Waters, Jr. |
| 4,519,776 A | 5/1985 | Deyoreo et al. |
| 4,559,006 A | 12/1985 | McGill et al. |
| 4,603,505 A | 8/1986 | Millard |
| 4,608,774 A | 9/1986 | Sherman |
| 4,625,453 A | 12/1986 | Smith |
| 4,634,369 A | 1/1987 | McGill et al. |
| 4,747,391 A | 5/1988 | Hanagan et al. |
| 4,785,573 A | 11/1988 | Millard |
| 4,829,978 A | 5/1989 | Schlosser |
| 4,891,904 A * | 1/1990 | Tabita ............................. 43/112 |
| 4,962,611 A | 10/1990 | Millard |
| 5,157,865 A | 10/1992 | Chang |

(Continued)

FOREIGN PATENT DOCUMENTS
DE    19961133    12/1999
(Continued)

OTHER PUBLICATIONS

Intl Search Report for PCT/US02/31550, Apr. 10, 2001.

(Continued)

*Primary Examiner* — Darren W Ark
(74) *Attorney, Agent, or Firm* — Jacobson Holman PLLC

(57) ABSTRACT

The present application discloses a device for attracting and capturing flying insects, and a method for attracting and capturing flying insects. The device and method use at least one electrically-powered airflow generator and an electrically-powered heater.

42 Claims, 5 Drawing Sheets

U.S. PATENT DOCUMENTS

| | | | |
|---|---|---|---|
| 5,167,090 A | | 12/1992 | Code |
| 5,177,961 A | * | 1/1993 | Whittenberger ............... 60/300 |
| 5,189,830 A | | 3/1993 | Montemurro |
| 5,195,883 A | | 3/1993 | Hanna et al. |
| 5,205,064 A | | 4/1993 | Nolen |
| 5,205,065 A | | 4/1993 | Wilson et al. |
| 5,255,468 A | | 10/1993 | Cheshire, Jr. |
| 5,274,609 A | | 12/1993 | Bradley |
| 5,282,334 A | * | 2/1994 | Kimura et al. ................. 43/125 |
| 5,301,458 A | | 4/1994 | Deyoreo et al. |
| 5,311,697 A | | 5/1994 | Cavanaugh et al. |
| 5,329,725 A | | 7/1994 | Bible |
| 5,382,422 A | | 1/1995 | Dieguez et al. |
| 5,408,970 A | | 4/1995 | Burkhard et al. |
| 5,417,009 A | | 5/1995 | Butler et al. |
| 5,566,502 A | * | 10/1996 | Shigetoyo ...................... 43/125 |
| 5,595,018 A | | 1/1997 | Wilbanks |
| 5,644,866 A | * | 7/1997 | Katsuda et al. ................ 43/129 |
| 5,647,164 A | | 7/1997 | Yates |
| 5,651,211 A | | 7/1997 | Regan et al. |
| 5,657,576 A | | 8/1997 | Nicosia |
| 5,669,176 A | | 9/1997 | Miller |
| 6,050,025 A | | 4/2000 | Wilbanks |
| 6,132,203 A | | 10/2000 | Masin |
| 6,145,243 A | * | 11/2000 | Wigton et al. .................. 43/139 |
| 6,240,248 B1 | * | 5/2001 | Fore ............................ 392/386 |
| 6,286,249 B1 | | 9/2001 | Miller et al. |
| 6,381,408 B1 | | 4/2002 | Jaworski |
| 6,443,434 B1 | * | 9/2002 | Prather .......................... 261/26 |
| 6,446,583 B2 | * | 9/2002 | Vieira ........................... 122/366 |
| 6,594,946 B2 | | 7/2003 | Nolen et al. |
| 6,675,528 B2 | * | 1/2004 | Jablin ............................ 43/139 |
| 2003/0084604 A1 | | 5/2003 | Durand et al. |
| 2003/0154643 A1 | | 8/2003 | Spiro et al. |
| 2003/0154645 A1 | | 8/2003 | Spiro et al. |
| 2003/0208951 A1 | | 11/2003 | Bossler |

FOREIGN PATENT DOCUMENTS

| | | |
|---|---|---|
| FR | 717903 | 1/1932 |
| JP | 1-14128 | 4/1989 |
| JP | 2-63679 | 5/1990 |
| WO | WO 9952352 | 10/1999 |

OTHER PUBLICATIONS

Owners Manual Bug Vac Model 1101, Mar. 17, 2003.

Mosquito Ecology Field Sampling, 2 ed., p. 500, 502, 517, 524, 546-547, 1993.

Carestia et al., Effectiveness of Carbon Dioxide as a Mosquito Attractant . . . , Mosquito News, vol. 27, No. 1, p. 90-92.

Dipteran Collection equipment folder, American Biophysics Corp., Jul. 1994.

Burkett et al., Light, Carbon Dioxide and Octenol-Baited Mosquito . . . , J. Am. Mosquito, vol. 17, #3, p. 196-205.

Floore et al., Mosquito trapping studies to determine efficacy . . . Flowtron, J. Florida Anti-Mosquito Assn., vol. 56, #1, p. 13-17.

Grant et al., Electrophysiological respones of receptor neurons in mosquito maxillary, J. Comparative Physiology A 177:389-396.

Kline, Comparison of Two American Biophysics Mosquito Traps, J. American Mosquito Control Assn., vol. 15, #3, p. 276-282.

Kubis, Database Caplus on STN, Am. Chemical Society, Columbus OH, Accession No. 2001:256247, PL177390, abstract.

Mboera et al., Comparison of Carbon Dioxide Biased Trapping Systems for Sampling . . . , Medical and Veterinary Entomology 14, p. 257-263.

Peterson et al., Studies of the Responses of the Female Aedes Mosquito, Dept. of Zoology, University of Western Ontario, London, Canada, 1951, p. 535-541.

Service, Mosquito Ecology Field Sampling Methods, Ch. 5, $2^{nd}$ ed. p. 349-498, 1995.

Service, Mosquito Ecology Field Sampling Methods, Ch. 6, $2^{nd}$ ed., p. 499-610.

Sudia et al., J. of the American Mosquito Control Assn., vol. 4, No. 4, p. 536-538.

Teledyne Brown Systems, Catalytic Burner literature.

U.S. Appl. No. 10/445,199, filed May 27, 2003, Durand et al.

U.S. Appl. No. 10/445,245, filed May 27, 2003, Durand et al.

U.S. Appl. No. 10/431,586, filed May 8, 2003, Durand et al.

\* cited by examiner

SYSTEM FOR TRAPPING FLYING INSECTS AND A METHOD FOR MAKING THE SAME

The present application claims priority to U.S. Provisional Application No. 60/419,085, filed Oct. 18, 2002, the entirety of which is hereby incorporated into the present application by reference.

BACKGROUND OF THE INVENTION

1. Field of the Invention

The present invention relates to a system for trapping flying insects such as mosquitoes, no-see-ums, and other insects 2. Description of Related Art Each year mosquito-transmitted diseases are responsible for over 3 million deaths and 300 million clinical cases. It is estimated that the worldwide costs associated with the treatment of such mosquito-transmitted diseases runs well into the billions of dollars. In many regions mosquitoes are the primary transmitters of debilitating diseases such as malaria, yellow fever, dengue fever, encephalitis, West Nile virus, sleeping sickness, filariasis, typhus and plague. In addition to the illnesses and deaths caused to humans, mosquito-transmitted diseases are a major cause of economic losses to livestock industries due to veterinary diseases. Further, mosquito-transmitted diseases pose an ever-present concern to regions dependent on revenues from tourism. Specifically, the presence of such diseases in a given region is believed to impact the willingness of tourists to select that region as a tourism destination.

With increased travel and world commerce it also is expected that some of these diseases will become major health problems in the continental United States and elsewhere. For example, the emergence of the West Nile virus in temperate regions of Europe and North America supports this expectation, which represents a threat to the health of the general public, as well as to the health of horses and other animals. The West Nile virus can result in encephalitis (inflammation of the brain) in humans and horses, and mortality in domestic animals and wild birds.

A number of methods for controlling mosquito populations or repelling mosquitoes have been proposed in the past. Examples of these are discussed herein below. As will be appreciated from the following discussion, each of these methods have significant drawbacks which render them impractical or ineffective.

One well-known method for suppressing mosquito populations is the use of chemical pesticides, such as DDT and Malathion. There are basically two types of mosquito pesticides available—adulticides and larvicides. Adulticides are chemicals used to kill mosquitoes that have developed to the adult stage. Infested areas are sprayed primarily from aircraft or motor vehicles. Efficacy of the sprayed chemicals is typically dependent upon wind, temperature, humidity, and time of day, the particular mosquito's resistance to the chemical used, and the base efficacy of the particular chemical. Adulticides must be applied for each generation of adults produced by rain, tidal flooding, or other periodic egg hatching trigger, and have a typical efficacy window of only ½ day. As such, these chemicals must be applied at a time when maximum contact with adult mosquitoes can be expected.

Larvicides, on the other hand, are applied to water sources to kill the larvae before they become adult mosquitoes. Larvicides generally take the form of one of three varieties: (1) an oil applied to the water surface that prevents the larvae from breathing and thus drowns them, (2) a bacteria, such as BTI (bacillus thuringiensis israelensis), which attacks the larvae and kills them, or (3) a chemical insect growth regulator (e.g., methoprene) that prevents the larvae from developing to the adult stage. However, larvicides often are not particularly effective for a variety of reasons. For example, most larvicides have a short efficacy period and must be applied to the water while the immature mosquitoes are at a particular stage of growth. Also, several species of mosquitoes, such as tree-hole breeders, root-swamp breeders, and cattail-marsh breeders, are not easily controlled with larvicides since the larvae either do not come to the surface (e.g., cattail marsh mosquito) or the water sources are so difficult to locate that the larvicide's cannot be economically applied (e.g., tree holes). Additionally, the mosquito that carries the West Nile virus (Culex Pippiens) lives and breeds around humans in gutters, underground drains, flower pots, birdbaths, etc. This not only makes the spraying of insecticides impractical due to the difficulty associated with effectively targeting such areas, many people are also uncomfortable with the use of chemical pesticides so close to their homes.

Regardless of their alleged efficacy, or lack thereof, the use of chemical pesticides has been reduced dramatically in both the United States and worldwide. A primary reason for this reduction is attributable to the rising public awareness of the potential health hazards related to pesticide use. Specifically, general public perception of the long-term health hazards presented by certain chemicals, such as DDT, has led to the banning of their use for mosquito control in many parts of the United States and other countries. Additionally, increasing pesticide resistance among mosquitoes has reduced the effectiveness of the chemicals conventionally used, thus bolstering the argument that the supposed benefits of chemical pesticides do not outweigh public health risks.

To some extent, natural predators also control mosquito populations. For example, certain fish and dragonflies (as both nymphs and adults) are reported to eat mosquito larvae and adults. Additionally, it is known that certain bats and birds also prey on mosquitoes. Some people, particularly those opposed to the use of chemical pesticides, have advocated that natural predators should be relied on as an environmentally safe means for controlling mosquito populations. Unfortunately, efforts in the past to utilize natural predators for effectively controlling mosquito populations have proven ineffective. For example, large bat towers were erected in three cities in the South during the 1920's with high expectations that the bats living in these towers would control mosquito populations. However, these towers were ineffective at adequately controlling the local mosquito populations. Studies of the stomach contents of the bats found that mosquitoes made up less than 1% of their food source.

Many people rely on repellents to keep mosquitoes away from their person, or from a certain area. These repellents by their nature do nothing to actually control the mosquito population; instead, they simply offer temporary relief to the person employing the repellent. Repellents can be either topical or aerial, and can take many forms, including lotions, sprays, oils (e.g., "Skin-So-Soft"), coils, and candles (e.g. citronella), among others. The most common repellents (lotions, sprays, and oils) are those that are used on the clothing or body. Many of these repellents do not actually "repel" mosquitoes per se—instead, some repellents simply mask the factors (carbon dioxide, moisture, warmth and lactic acid), which attract a mosquito to its host. Although these repellents are fairly inexpensive, they often have an offensive odor, are greasy, and are effective for only a limited duration. It has also been found that repellents, which contain DEET, or ethyl hexanediol, actually become attractive to mosquitoes after a period of time. Therefore, it is advisable when using repellents to wash them off or reapply fresh repellent when the protective period has passed.

In addition to being unpleasant, many repellents are coming under close scrutiny with respect to the potential long-term health hazards they may pose. DEET, considered by many entomologists to be the best repellent available, has been marketed for over 30 years, and is the primary ingredient of many well-known commercial sprays and lotions. Despite the long-term widespread use of DEET, the U.S. Environmental Protection Agency (EPA) believes that DEET may have the ability to cause cancers, birth defects, and reproductive problems. In fact, the EPA issued a consumer bulletin in August 1990 in which they stated that a small segment of the population may be sensitive to DEET. Repeated applications—particularly on small children—may sometimes cause headaches, mood changes, confusion, nausea, muscle spasms, convulsions or unconsciousness.

Mosquito coils have been sold for many years as a means for repelling mosquitoes. These coils are burnt to emit a repellent smoke. Products manufactured some 20 years ago were sold under the trade name Raid Mosquito Coils and contained the chemical Allethrin. Recent products are trade named OFF Yard & Patio Bug Barriers and contain the chemical Esbiothrin. These products may provide some relief from mosquito activity; however, they do not reduce the number of mosquitoes in a region, and they emit smoke and chemicals into the vicinity. Also, with even the slightest breeze, their potential effect is diminished, as the smoke and chemicals are dispersed over a large area and thus become diluted and less effective.

Many people have also touted the benefits of citronella in repelling mosquitoes, whether it is in the form of candles, plants, incense, or other mechanisms. According to a recent study, citronella-based products have been shown to be only mildly effective in repelling mosquitoes and then only when the candles were placed every three feet around a protected area. This treatment was only slightly more effective than burning plain candles around a protected area. In fact, it is believed that burning the candles increases the amount of carbon dioxide in the air, causing more mosquitoes to be drawn into the general area rather than reducing the number of mosquitoes in the area. Despite these drawbacks, the current market for citronella-based products is quite large.

Introduced in the late 1970s, the familiar "black-light" electrocution devices, referred to as "bug zappers," were initially a commercial success. Although essentially ineffective at killing mosquitoes, bug zappers sell at a current rate of over 2,000,000 units annually. The ineffectiveness of these devices at killing mosquitoes has been proven in academic studies and the personal experiences of many bug zapper owners. Specifically, electrocution devices are ineffective at killing mosquitoes because they do not attract most mosquitoes. The reason for this is that these devices only attract insects that are attracted to light, which is not the case with most species of mosquitoes.

U.S. Pat. No. 6,145,243 ("the '243 patent") discloses an insect trapping device developed by the assignee of the present application, American Biophysics Corporation of East Greenwich, R.I. The device of the '243 patent discloses the basic construction of a device that uses combustion to generate a flow of carbon dioxide for attracting mosquitoes and other flying insects towards an inlet on the device. A vacuum draws the insects attracted by the carbon dioxide through the inlet and into a trap chamber. The trap chamber includes a disposable mesh bag in which the mosquitoes become dehydrated. When the bag becomes full, it can be removed and replaced. U.S. patent application Ser. No. 2003/0084604A1 ("the '604 application"), also owned by American Biophysics, discloses another device for attracting and capturing insects that also uses combustion to generate carbon dioxide.

While the device disclosed in the '243 patent and the '604 application have been commercially successful for American Biophysics Corporation, it would be desirable to provide a system that is of significantly lower cost, and thus available to more consumers. It is believed that the additive impact of widespread use of this technology will help lead to better control of mosquito and other flying insect populations and, in turn, to reduced incidents of insect transmitted diseases.

SUMMARY OF THE INVENTION

One aspect of the invention provides a device for attracting and capturing flying insects. The device comprises a frame, an insect trap chamber, a supply of a diffusible insect attractant, at least one electrically-powered airflow generator, and an electrically-powered heater. The frame provides at least one outlet opening and at least one inlet opening. Each of the outlet and inlet openings are communicated to a surrounding atmosphere. The insect trap chamber is communicated to the surrounding atmosphere through the at least one inlet opening. The at least one airflow generator is operable to generate an outflow flowing outwardly to the surrounding atmosphere through the at least one outflow opening, the outflow consisting essentially of ambient air from the surrounding atmosphere with the insect attractant diffused therein from the supply thereof. The at least one airflow generator is also operable to generate an inflow flowing inwardly from the surrounding atmosphere through the at least one inlet opening and then into the insect trap chamber. This enables the inflow to draw insects attracted to the device by the insect attractant diffused in the outflow into the insect trap chamber. The heater is operable to heat the supply of the insect attractant above ambient temperature so as to facilitate diffusion of the insect attractant.

Another aspect of the present invention provides a method for attracting and capturing flying insects. The method comprises:

providing a device comprising (a) an insect trap chamber, (b) a supply of a diffusible insect attractant, and (c) at least one electrically-powered airflow generator;

heating the supply of the diffusible insect attractant above ambient temperature with the electrically-powered heater to facilitate diffusion of the insect attractant;

generating, with the at least one airflow generator, an outflow flowing outwardly through at least one outflow opening provided on the device and communicated to a surrounding atmosphere, the outflow consisting essentially of ambient air from the surrounding atmosphere with the insect attractant diffused therein from the supply thereof; and drawing, with the at least one airflow generator, an inflow flowing inwardly through at least one inflow opening and then into the insect trap chamber, the at least one inlet opening being provided on the device and communicated to the surrounding atmosphere, thereby enabling the inflow to draw insects attracted to the device by the insect attractant diffused into the insect trap chamber.

Other object, features, and advantages of the present invention will become apparent from the following detailed description, the accompanying drawings, and the appended claims.

DETAILED DESCRIPTION OF AN ILLUSTRATIVE EMBODIMENT OF THE INVENTION

Figure 1:
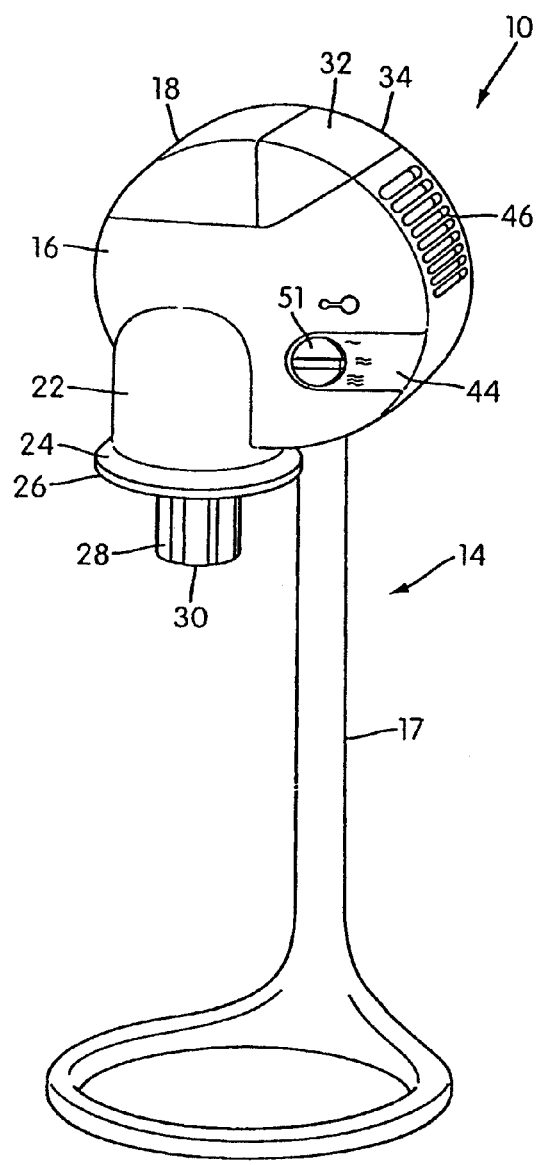
FIG. 1 is a perspective view of an insect trapping system constructed in accordance with the principles of the present invention.
Figure 2:
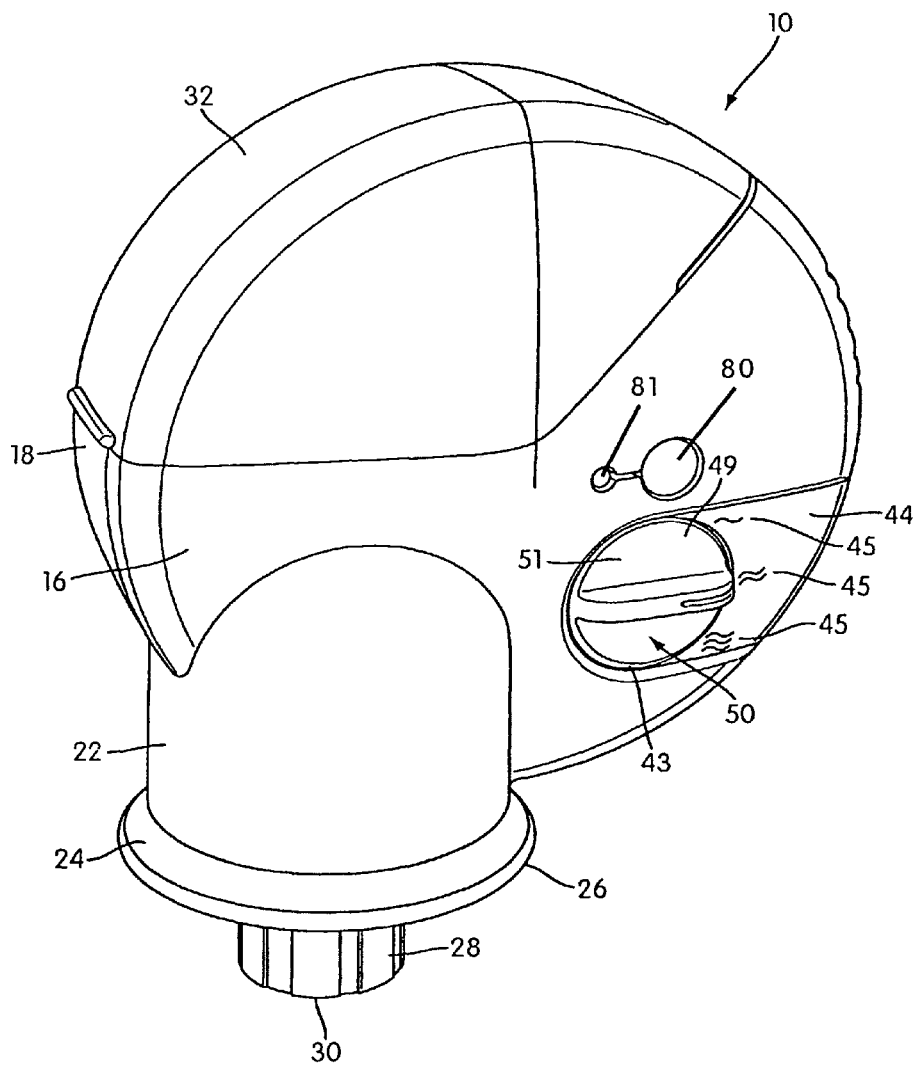
FIG. 2 is a perspective view of the insect trapping system of FIG. 1, showing the housing thereof in closer detail.

FIGS. 1 and 2 are perspective views of an exemplary flying insect trapping device, generally indicated at 10, constructed in accordance with the present invention. Broadly speaking, the general function of the device 10 is to emit an outflow consisting essentially of ambient air and an insect attractant, for attracting mosquitoes and/or other flesh biting insects. Then, an inflow draws the attracted insects into a trap chamber within the device, whereat the insects are captured and may be killed by poison or dehydration/starvation. Alternatively, a user engaged in the study of insects may opt to not kill the captured insects and instead may remove them from the device 10 prior to dying for purposes of live examination. Regardless of the specific insect capturing purpose the user has in mind, the overall function of the device 10 is to attract and capture flying insects. The specifics of how the present invention operates to achieve this broad general function is discussed herein below.

The device 10 comprises a supporting frame, generally indicated at 14. The supporting frame 14 includes a housing 16 supported on at least one leg 17. In the illustrated embodiment, a single leg 17 is used to support the housing 16. The supporting frame 14, however, may have any construction or configuration suitable for carrying the operative components discussed herein below, for example a tripod arrangement may also be used. Additionally, the frame may include wheels, as shown in the aforementioned U.S. Pat. No. 6,145,243 and U.S. patent application Ser. No. 2003/0084604A1, the entirety of each of which is hereby incorporated into the present application by reference. Alternatively, instead of using legs, the frame may include a bracket (not shown) for mounting the device 10 to the interior or exterior wall of a building, a fence, etc., or a hanger (not shown) for suspending the device from a post or ceiling.

The housing 16 includes a shell 18. In the illustrated embodiment, the shell 18 is molded from plastic. However, the housing 16 in general may be made from any materials and may take any shape, configuration, or construction.

A tubular intake nozzle 22 protrudes downwardly from the bottom of shell 18 and is formed integrally therewith. The intake nozzle 22 has a flared lower end 24. The flared lower end 24 defines an insect inlet opening 26 that opens to the surrounding atmosphere. As will be appreciated from the details provided below, a vacuum is applied to the nozzle 22 and the insects attracted to the device 10 will be drawn into the insect inlet opening 26 for capture. The intake nozzle 22 and the inlet opening 26 provided thereby may be carried on the frame 14 in any suitable matter and the construction illustrated and described is only an exemplary construction. Thus, other constructions or configurations may be used. For example, multiple insect inlet openings, and/or openings with other locations, shapes or orientations may be used.

Concentrically mounted within the intake nozzle 22 is an outlet nozzle 28. The outlet nozzle 28 provides an exhaust outlet opening 30 on the lower end thereof that opens to the surrounding atmosphere. The function of the outlet nozzle 28 and its exhaust outlet opening 30 is to allow an outflow containing insect attractant to flow outwardly and downwardly therefrom. As the downward flow or "plume" of the exhaust gas reaches the ground, it flows radially outwardly from the device 10 along the ground. Mosquitoes and other insects will be able to sense the insect attractant and follow the same to its source, namely the exhaust outlet opening 30.

As can be appreciated from the construction disclosed, because the outlet nozzle 28 is concentric with the intake nozzle 22, the attracted insects will follow the insect attractant to its source (i.e., the outlet opening 30) and thus they will intersect the inflow prior to reaching the outlet opening 30. As a result, the attracted insects will be "vacuumed" by the inflow into the intake nozzle 22 whereby they are drawn into the device 10 and captured therein. The respective flows of the vacuum intake and the exhaust gas outflow are indicated by the inflow and outflow arrows in FIG. 3, and are referred to as "counterflow." For further details and variations on this aspect of the disclosed construction, reference may be made to the above-incorporated '243 patent and '604 application. Also, reference may be made to U.S. Pat. No. 6,286,249, filed Sep. 17, 1996, the entirety of which is hereby incorporated into the present application by reference. It should be understood, however, that the use of a counterflow arrangement is entirely optional and should not be considered limiting, although it is preferred. Further, outlet nozzle 28 and its outlet opening 30 may be carried on the frame in any suitable manner and the construction illustrated and described is only an exemplary construction. For example, multiple outlet openings and/or openings with other locations, shapes or orientations may be used.

Figure 3:
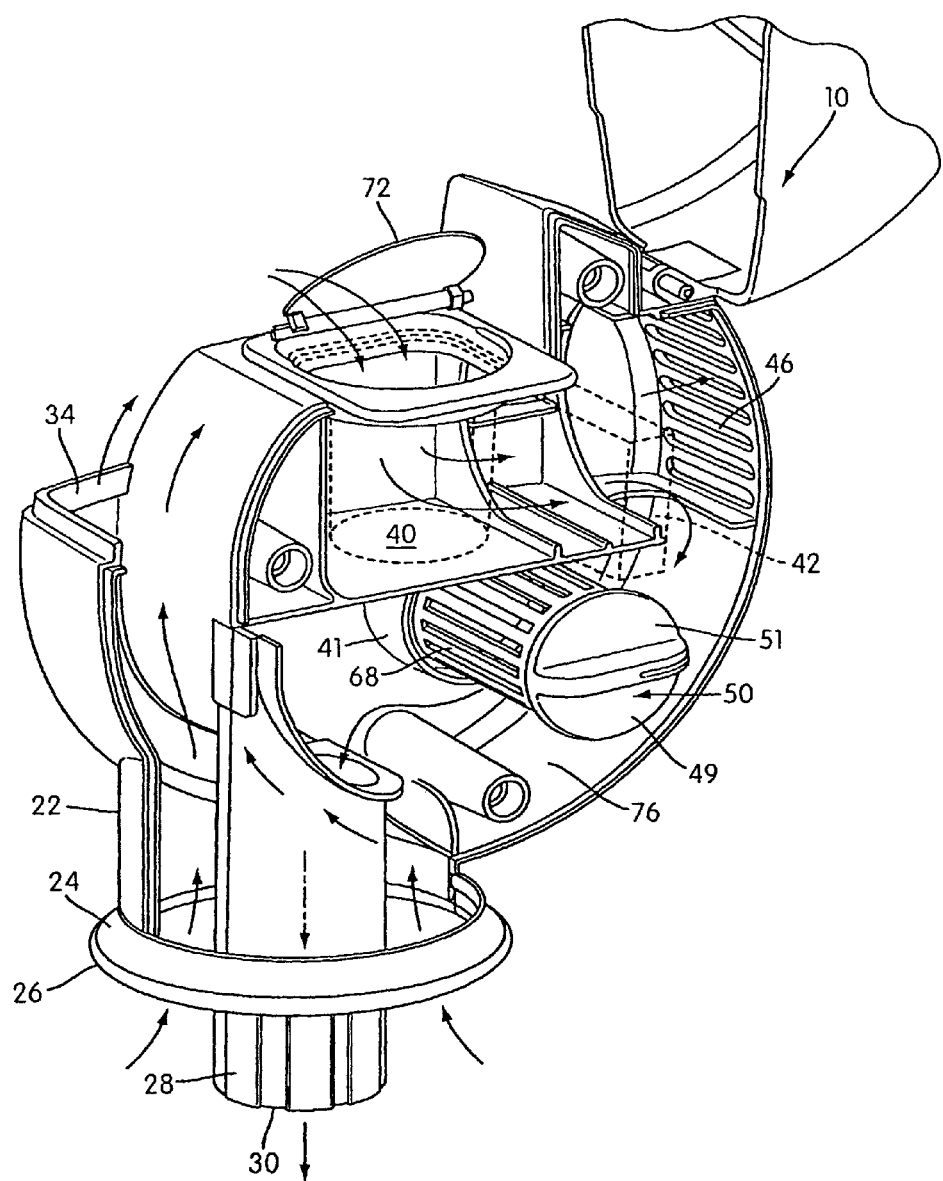
FIG. 3 is a cut-away sectional view showing the interior layout of an insect trapping system by taking a section being taken along a forward/rearward centerline of the system
Figure 4:
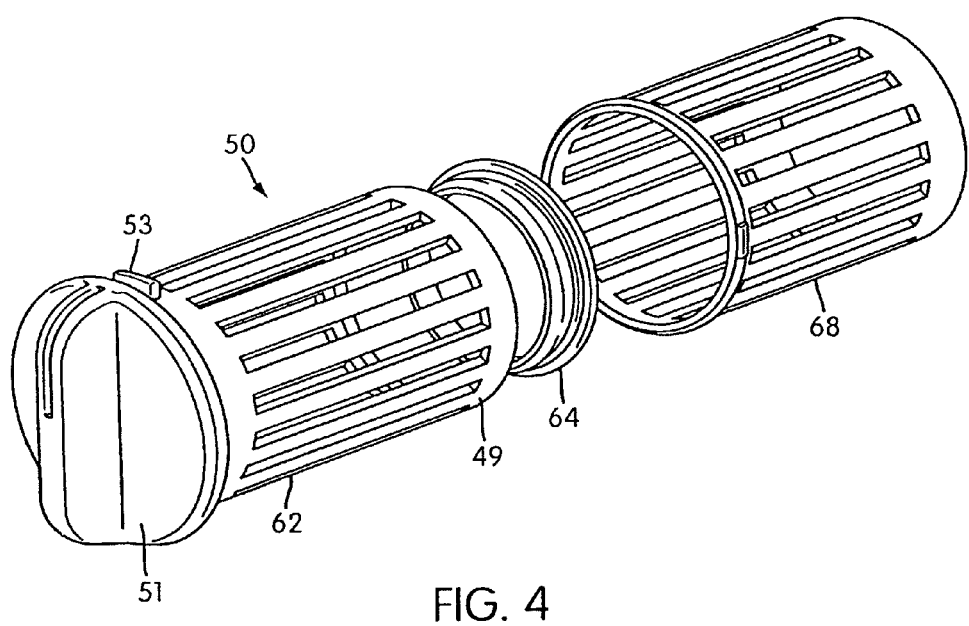
FIG. 4 is a profile view of an insect attractant cartridge used in the trapping system of the Figures.
Figure 5:
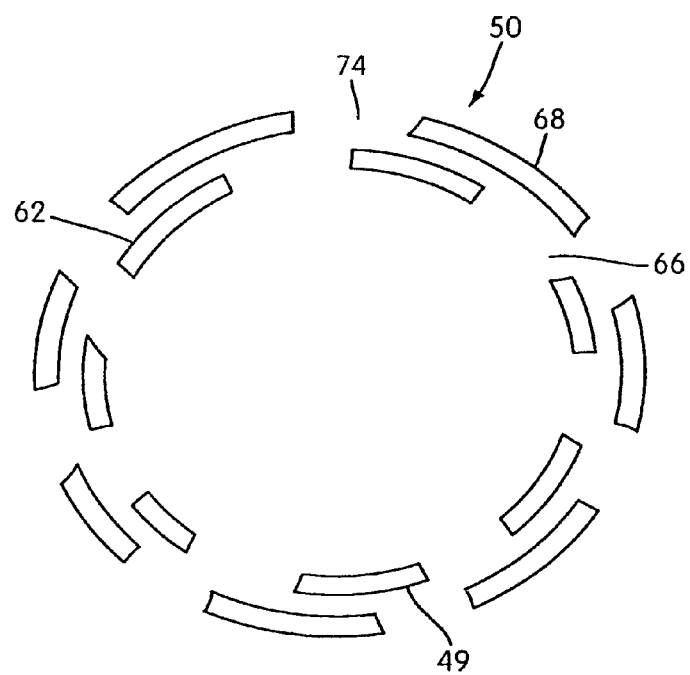
FIG. 5 is a cross-sectional view of an insect attractant cartridge used in the trapping system of the Figures.

The housing 16 includes an access door 32 (which may be opaque, translucent, or transparent) that can be moved between open and closed positions to open and close an access opening 34 formed in the housing wall. The access door 32 and the access opening 34 opened and closed thereby is best illustrated in FIGS. 1-3. In the broader aspects of the invention the door 32 may be entirely separable from the housing 16, and may be connected for opening and closing movements using any suitable construction. In fact, the provision of the door 32 is not necessary at all and is simply a feature for convenience. A deformable gasket may be attached along the periphery of the opening 34 to provide a seal between the door 32 and the periphery of the opening 34. The role of the access door 32 and its associated opening 34 is to enable a user to gain access to the interior of the housing 16.

As will be described in further detail below, a mesh bag (shown in phantom at 40), the interior of which defines an insect trap chamber, is removably mounted within the housing 16. The chamber defined by the bag 40 is communicated to the insect inlet 26 so that the insects drawn in by the vacuum will be deposited in the bag 40 whereat they will become dehydrated and perish. Alternatively, the material of the bag 40 may be treated with a poison for purposes of facilitating the insect termination function; however, that is not a necessary feature of the invention. The access door 32 and its associated opening 34 permit access into the interior of the housing 16 to allow the user to access the mesh bag 40 as desired for purposes of removal/replacement. Also, as another alternative, a plastic box or any other suitable structure may be used in place of mesh bag 40. In the disclosed embodiment, the door 32 may be formed from a transparent material to enable to user to visually inspect the bag 40 to determine whether it needs removal/replacement. Specifically, a door 32 made of transparent material would enable the user to visually verify whether the bag 40 is at or near its full capacity of insects. In the broader aspects of the invention, the door 32 need not be transparent, and further, as mentioned previously, the device does not necessarily require the door 32 and its associated opening 34.

FIG. 3 illustrates a cut-away view of device 10, constructed in accordance with the principles of the present invention. As can be readily seen from this cut-away view, air flows into insect inlet 26 and through intake nozzle 22 causing any flying insects which may be located in the surrounding atmosphere proximate to the inlet 26 to be drawn into and deposited into the bag 40 which is communicated with the inlet 26 via intake nozzle 22. The vacuum that causes the inflow of air into the device 10 is created by at least one electrically-powered airflow generator. In the illustrated embodiment, the at least one airflow generator is constituted by a single electrically-powered fan (shown in phantom at 42) which is placed downstream of the insect bag 40. The fan 42 is configured to draw air from the upstream direction, e.g., through the insect inlet, then through the intake nozzle 22 and then through the insect bag 40, to produce a vacuum which is capable of drawing insects into device 10. The ambient air which is drawn through the insect bag 40 by the fan 42 is then sent downstream past the fan and through outlet nozzle 28.

Additionally, ambient air may exit the shell 18 through a vent, such as the vents 46, shown in FIGS. 2A and 3. The use of vents 46 is optional, but desirable. Specifically, the use of vents 46 along the outflow path allows part of the outflow to escape through the vents 46, and part of the outflow to flow through to the outflow opening 30. In the illustrated embodiment wherein the inflow is ultimately exhausted as the outflow, these vents 46 enable the inflow to be drawn in at a relatively high mass flow rate, while the outflow can flow out the outlet opening 30 at a relatively lower mass flow rate. This is advantageous because providing the outflow with a high mass flow rate may scare flying insects away prior to reaching the vacuuming inflow, but at the same time a relatively high mass flow rate is desired for the inflow to ensure that the insects cannot escape the vacuuming effect.

Although not shown in the Figures, the fan 42 may be powered by a number of different methods, including an array of solar power panels, a battery or via a standard electrical plug.

Before exiting the outlet 30 the ambient air flows through an insect attractant receptacle device 50 containing a supply of an insect attractant. The insect attractant receptacle 50 may include a cartridge 49 that can be inserted into the device 10 through an opening 43 formed in a wall of the housing 16. The receptacle 50 may also include a chamber 68 that extends inwardly from the opposite wall of the housing. The cartridge 49 is received within the chamber 68 as it is inserted through the opening 43, and an adjusting knob 51 on one end of the cartridge 49 sits within the opening 43. The chamber 68 and the adjusting knob 51 will be discussed below. As can be seen in the Figures, the receptacle 50 has openings that allow ambient air to flow through the receptacle 50, whereby the attractant can diffuse into the flowing air, and then the air with the attractant diffused therein can flow out as the outflow.

Additionally, an electrically-powered heater (interchangeably referred to as a heating element, not shown) may be provided within a chamber 76 (FIG. 3). The purpose of the heating element may be two fold. First, the heater may heat the ambient air so it is warmer than ambient temperature before it exits the device 10; and, second, the heater may be used to heat the insect attractant so it is better able to diffuse into the ambient air. By heating the attractant, the heater can also serve to heat the ambient air at the same time. Specifically, the heater preferably heats the attractant sufficiently above ambient temperature to facilitate diffusion of the attractant into the outflow, but not so much that the outflow is so hot that insects are not attracted to it. The preferable maximum temperature of the outflow as it leaves the outflow opening is below 115 degrees Fahrenheit, but above ambient, although this range should not be considered limiting. The temperature to which the attractant is heated will depend on its composition, and should be sufficient to ensure that an effective amount of attractant is diffused into the outflow to attract insects.

In an embodiment, a heating coil, which may be a resistance heater powered by the same source as the fan 42, may be provided around the outer housing 62 of the insect attractant cartridge 49 by being mounted to the inside of chamber 68, preferably along substantially the entire length of the attractant for an even release of attractant and depletion along its length. This coil would have spaces between its helices to allow airflow therethrough and over the attractant. In another embodiment, the heating element may be a block heater mounted adjacent the chamber 68. Alternatively, the insect attractant could have an internal bore therein and the heater could be a resistance or other type of heater received within the bore. In the arrangement where the attractant has an internal bore, preferably the bore is elongated and extends for a substantial portion of the attractant, and the heater likewise is elongated and extends for the length of the bore. This encourages steady, even release rates. Any suitable construction or configuration may be used for the heater, and it is contemplated that multiple smaller heaters could be used.

The device 10 may include a temperature sensor (not shown) positioned along the outflow path and fed back to a controller (not shown) that controls the heater. The controller and feedback may be used to control the heater to keep the outflow within a desired temperature range (i.e., by turning the heater on/off or adjusting the current flow to the heater to vary its heat output). The device 10 may also have manually operable on/off switch, such as the push-button switch 80 shown mounted on the housing 16. The switch 80 is communicated to the controller and can be selectively pushed or otherwise actuated by the user to activate the controller to turn the heater and fan on and off. An optional LED on/off indicator 82 is positioned adjacent the switch 80. When the LED is illuminated, the user knows the device 10 is running; and when the LED is not illuminated, the user knows the device 10 is off. These features are all optional.

As best shown in FIG. 3, a flap 72 may be provided in the flow path to control the amount of which flows into the system and also to prevent the insects in bag 40 from being able to exit the device. The flap 72 preferably has a spring (not shown) that biases the flap 72 to a closed position closing the top of the bag 40. This prevents insects from escaping from the bag 40. Also, the flap 72 preferably has a leg (not shown) on the side of its pivot axis. This leg is engaged by the door 32 as the door moves to its closed position to move the flap 72 to its open position. Thus, when the door 32 is opened, the leg will be disengaged and the spring will move the flap 72 to its closed position. This prevents insects from escaping when the user opens the door 32. Although the Figures show both the door 32 and flap 72 open at the same time, this is done for purposes of illustrating the opening in which the bag 40 is mounted. Normally, when the door 32 is open, the flap 72 would be biased closed until the user opens it to remove the bag 40. Preferably, the flap 72 may be made transparent so the user can look down into the bag 40 without having to open the flap 72.

Additionally, as seen, chamber 76 may be very large compared with the air flow exiting the device through outlet 30. The large chamber allows the ambient air to remain in the chamber longer and therefore collect more insect attractant. Also, by remaining in the chamber longer, the heater may be better able to heat the air so it is above ambient temperature. In a sense, the chamber 76 acts as a fluid capacitor along the outflow path. The provision of such a chamber 76, however, is optional.

Although the insect attractant receptacle 50 is shown as being positioned after (i.e., downstream of the fan 42) it should be understood and appreciated that the attractant can be located at any point in the flow path, preferably within the device 10. For example the attractant may be located within the outlet nozzle 28 or may even be located before (i.e., upstream of) the fan 42.

The attractant is selected for its capability to attract flying insects. The attractant may be manufactured such that it is a solid plug sized to fit within housing 16 or within the insect attractant receptacle 50. Alternatively, the attractant may be impregnated into a carrier. Preferably, solid attractants are powders in free-flowing or compressed form. Compressed or molded forms of attractant include tablet or "bullet-shaped" forms of the compound, bricks, or layered cakes. Examples of preferred embodiments of the attractant lures include powdered mixtures of L(+) lactic acid and calcium lactate. In a particularly embodiment, at least one biochemical attractant is mixed with a suitable polymer and is molded into a three dimensional geometric shape designed to fit inside attractant receptacle 50. Alternatively, a semi-solid attractant having both a solid and a liquid phase, such as a gel, can be used. The invention contemplates the use of any attractant that can diffuse into an airflow. Preferably, the attractant is a solid or semi-solid, but it is contemplated that a diffusible liquid attractant could be used. For examples of such attractants, reference may be made to any of the patents/applications mentioned above, or U.S. patent application Ser. No. 10/431,586, owned by American Biophysics Corp., the assignee of this application, the entirety of which is incorporated into the present application by reference.

As shown in FIG. 4, cartridge 49 of the insect attractant receptacle 50 which is mountable within the device 10 includes an outer housing 62 and a cap 64 for closing the open end of the housing 62. The cap 64 may have snap-in elements for releasably securing it within the housing 62. The outer housing 62 has a plurality of openings 66 for enabling the attractant to mix with the ambient air that will eventually flow out of outlet 30, as illustrated in FIG. 3. In the illustrated embodiment, the cartridge 49 mounts by being inserted into opening 43 and slid into the chamber 68. The adjusting knob 51 has a key 53 and a corresponding keyway (not shown) is positioned at the edge of the opening 43. By this construction, when the key 53 passes through the keyway, the rotation of the knob 51 and the cartridge 49 will move the key 53 out of alignment with the keyway, thereby preventing withdrawal of the cartridge 49 until such time as the knob 51 is rotated to re-align the key 53 with the keyway. When the user desires, the attractant can be removed and replaced as needed by sliding the cartridge 49 out through opening 43, and then opening the cap 64 to access the interior of the housing 62.

FIG. 5 is a cross-sectional view of the insect attractant receptacle 50 which illustrates how the insect attractant receptacle 50 may be adjusted to alter the amount of insect attractant diffusion which may be desired. The cartridge 49 is mounted within the chamber 68 which is provided with a plurality of openings 74. Accordingly, the cartridge 49, which is also provided with openings 66 on its outer housing 62 may be rotated about a center axis relative to the chamber 68. By rotating the outer housing 62 relative to the chamber 68, it is possible to alter the effective size of the adjustable openings which are formed by aligning openings 74 with openings 66. As may be understood by a person skilled in the art, by altering the effective size of these adjustable openings, the amount of insect attractant which is mixed with the air may be controlled. That is, by controlling the effective size of these openings, the diffusion rate of the attractant can be controlled based on the amount of air flowing through the device 50 and over the attractant.

As can be seen from FIG. 2, the housing 16 has a slightly recessed section 44 that has a series of markings 45. These markings 45 correspond to various positions of adjustment for the knob 51, and housing 62, thus providing a visual indication of the effective size of the adjustable openings defined by cooperating openings 66 and 74. Specifically, the knob 51 will point at the marking with one line for a smaller opening size and lower attractant diffusion rate; the marking with two lines for a medium opening size and medium attractant diffusion rate; and the marking with three lines for a larger opening size and a higher attractant diffusion rate. Any other arrangement for enabling the user to control and/or verify the opening size and diffusion rate may be used.

The illustrated and described construction for the attractant receptacle 50 should not be considered limiting and any other suitable construction may be used. For example, a construction wherein the outer housing 62, chamber 68, and knob 51 are integrated into the device 10 may be used, and the attractant could be inserted through a door on the knob 51 or on the wall of the housing 18 opposite the knob.

In another alternative wherein the heater is designed to be received in an internal bore of the attractant, the heater could be mounted to the housing wall at the distal end of the chamber 68 in a cantilevered manner to extend along the axis of the chamber 68. For this alternative, the cartridge 49 described and illustrated could be modified by providing a central hole in the cap 64 so that the hole in the cap 64 and the attractant's bore can heater can pass over the heater as the cartridge 49 is being inserted.

Likewise, in the construction described above wherein the outer housing 62, chamber 68, and knob 51 are integrated into the device 10, and a door is provided on the knob 51 or the wall of the housing opposite the knob 51, the heater could be mounted in a cantilevered manner within the chamber 68 such that the attractant's internal bore can be slid over the heater as it is being inserted. Further, it is contemplated that the broader aspects of the invention can be practiced without the use of an adjustable insect attractant receptacle 50.

The attractant used to lure flying insects to insect inlet 26 is preferably an organic acid similar to those present on animal skin due to the inclusion of such acids in sweat and breath. In particular, the organic acid may be 2-hydroxy-propionic acid, commonly known as lactic acid or a derivative thereof. Suitable derivatives of lactic acid, such as a lactic acid salt, are effective lures for flying insects. Such salts include ammonium lactate. More preferably, the attractant is L(+) lactic acid. Combinations of lactic acid and one or more salts thereof are also suitable attractants. Lactic acid or a derivative thereof may be combined with a second attractant. The second attractant may be mixed with the lactic acid, or may be housed separately within the insect trapping device. For example, the second attractant may be ammonia. The lactic acid attractants may be lures formulated in solid or semi-solid form.

In describing the attractant, the term solid may also be understood as encompassing attractants wherein a liquid attractant is soaked or embedded in a solid, porous structure, such as a sponge or a porous frit.

In the illustrated embodiments, the general construction is such that the inflow is drawn in by the fan 42 and then is exhausted as the outflow by the fan 42. In other words, the inflow, in a sense, "becomes" the outflow upon passing through the fan 42. Preferably, the fan 42 is downstream of the insect trap chamber 40 (i.e., the trap chamber 40 is positioned on the "inflow path" and the fan 42 is positioned between the chamber 40 and the "outflow path") so that the insects drawn in by the inflow do not contact the fan blades. This keeps the fan blades cleaner.

However, any flow path configuration or structure for generating airflow may be used in place of the exemplary embodiment illustrated. Thus, the term "at least one airflow generator" is intended to encompass a construction wherein a single airflow generator, such as fan 42 is used to generate both the inflow and outflow, as well as constructions wherein multiple airflow generators are used for generating the inflow and outflow. For example, the inflow and outflow paths could be distinct and separate from one another, and the airflow generator of the device would comprise a fan for each flow path for generating airflow therethrough. Likewise, in place of the single fan 42 illustrated, the airflow generator of the device 10 could be constituted by any number of larger or smaller fans to provide the airflow. Also, the airflow generator could be constituted by one or more piston pumps or other structure suitable for generating airflow. Thus, in a broad sense, the invention may be practiced with any flow path configuration and any suitable form of an airflow generator. The term airflow generator as used herein is a generic structural term intended to encompass any structure suitable for generating the inflow and outflow, whether that structure be a fan, a pump, or any other such device or combination thereof.

In the illustrated embodiment, the use of a solid or semi-solid attractant is preferred. The advantage of using a solid or semi-solid attractant in a device that omits a combustion device is that the device can be made at a substantially lower cost, yet still function effectively. With a purely liquid attractant, the attractant tends to evaporate quicker and reloading/handling can be messy. With a combustion device, the parts associated with the burner and combustion chamber are relatively expensive and add significant cost to the device. With stored gaseous attractants (e.g., a tank of pressurized $CO_2$), the provision of compressed gas and the valving for releasing the same also adds significant cost to the device. However, using a solid or semi-solid attractant that diffuses to produce an outflow consisting essentially of ambient air from the surrounding atmosphere and the diffused attractant provides a device that avoids the problems or higher costs associated with the other types discussed above. The provision of the heater is further advantageous because it elevates the temperature of the attractant and facilitates its diffusion, thereby enhancing its effectiveness.

The foregoing illustrated embodiment has been provided to illustrate the functional and structural principles of the present invention and is not intended to be limiting. To the contrary, the present invention is intended to encompass all alterations, additions, substitutions and equivalents within the spirit and scope of the following appended claims.

What is claimed is:

1. A device for attracting and capturing flying insects, the device comprising:
   a frame providing at least one inlet opening communicated to a surrounding atmosphere;
   an insect trap chamber communicated to the surrounding atmosphere through the at least one inlet opening;
   a supply of a diffusible insect attractant;
   an attractant receptacle, the supply of the diffusible insect attractant being received within the attractant receptacle;
   the attractant receptacle having at least one adjustable opening, the at least one adjustable opening being selectively adjustable so as to control exposure of the insect attractant, thereby controlling a rate of diffusion of the insect attractant; and
   at least one airflow generator operable to generate an inflow flowing inwardly from the surrounding atmosphere through the at least one inlet opening and then into the insect trap chamber, thereby enabling the inflow to draw insect attracted to the device by the insect attractant into the insect trap chamber.

2. A device according to claim 1, wherein the diffusible insect attractant is a solid or semi-solid insect attractant.

3. A device according to claim 1, wherein the insect trap chamber includes a perforated trap having a plurality of perforations sized to enable the inflow drawn into the insect trap chamber to flow therethrough but to prevent passage of the insects therethrough.

4. A device according to claim 1, wherein the frame provides at least one outflow opening communicated to the surrounding atmosphere,
   the at least one airflow generator also being operable to generate an outflow flowing outwardly to the surrounding atmosphere through the at least one outflow opening.

5. A device according to claim 4, wherein the attractant receptacle and the insect attractant are positioned such that the attractant diffuses into the outflow.

6. A device according to claim 5, wherein the outflow consists essentially of ambient air from the surrounding atmosphere with the insect attractant diffused therein.

7. A device according to claim 6, wherein the insect trap chamber includes a perforated trap having a plurality of perforations sized to enable the inflow drawn into the insect trap chamber to flow therethrough but to prevent passage of the insects therethrough.

8. A device according to claim 7, wherein the at least one outflow opening is communicated to the insect trap chamber by an outflow path, wherein the at least one inlet opening is communicated to the insect trap chamber by an inlet path, and wherein the inflow flowing through the perforated trap flows into the outflow path to become the outflow.

9. A device according to claim 8, wherein the at least one airflow generator comprises a fan system positioned between the outflow path and the insect trap chamber, the fan system being arranged to generate both the inflow and the outflow by drawing ambient air inwardly from the surrounding atmosphere through the at least one inlet opening, the inflow path, and the perforated trap, and then forcing the ambient air outwardly to the surrounding atmosphere through the outlet path and the at least one outflow opening.

10. A device according to claim 9, wherein the fan system includes a single fan.

11. A device according to claim 1, further comprising an electrically powered heater operable to heat the supply of the diffusible insect attractant above ambient temperature so as to facilitate diffusion of the insect attractant.

12. A device for attracting and capturing flying insects, the device comprising:
- a frame providing at least one outlet opening and at least one inlet opening, each of the at least one outlet and at least one inlet openings being communicated to a surrounding atmosphere;
- an insect trap chamber communicated to the surrounding atmosphere through the at least one inlet opening;
- a supply of a diffusible insect attractant;
- at least one airflow generator operable to generate (a) an outflow flowing outwardly to the surrounding atmosphere through the at least one outlet opening, the outflow consisting essentially of ambient air from the surrounding atmosphere with the insect attractant diffused therein from the supply and (b) an inflow flowing inwardly from the surrounding atmosphere through the at least one inlet opening and then into the insect trap chamber, thereby enabling the inflow to draw insects attracted to the device by the insect attractant diffused in the outflow into the insect trap chamber;
- an attractant receptacle in which the supply of diffusible insect attractant is received, the attractant receptacle being positioned such that the outflow flows through the receptacle for exposure to the insect attractant, the attractant receptacle being constructed to enable the insect attractant to be removed therefrom for replacement; and
- an electrically-powered heater disposed proximate the attractant receptacle, the heater being operable to heat the supply of the diffusible insect attractant in the attractant receptacle above ambient temperature so as to facilitate diffusion of the insect attractant in the outflow.

13. A device according to claim 12, wherein the diffusible insect attractant is a solid or semi-solid insect attractant.

14. A device according to claim 13, wherein the heater is positioned immediately adjacent the supply of the solid or semi-solid diffusible insect attractant.

15. A device according to claim 14, wherein said insect trap chamber includes a perforated trap having a plurality of perforations sized to enable the inflow drawn into said insect trap chamber to flow therethrough but to prevent passage of the insects therethrough.

16. A device according to claim 15, wherein the at least one outlet opening is communicated to the insect trap chamber by an outflow path, wherein the at least one inlet opening is communicated to the insect trap chamber by an inlet path, and wherein the inflow flowing through the perforated trap flows into the outflow path to become the outflow.

17. A device according to claim 16, wherein the at least one airflow generator comprises a fan system positioned between the outlet path and the insect trap chamber, the fan system being arranged to generate both the inflow and the outflow by drawing ambient air inwardly from the surrounding atmosphere through the at least one inlet opening, the inflow path and the perforated trap, and then forcing the ambient air outwardly to the surrounding atmosphere through the outlet path and the at least one outflow opening.

18. A device according to claim 17, wherein said fan system includes a single fan.

19. A device according to claim 18, further comprising a power cord with a connector on a free end thereof, said cord being electrically connected to said fan and said connector being configured for connection to an electrical power supply for supplying electricity to said fan.

20. A device according to claim 18, further comprising one or more replaceable batteries for supplying electrical power to said fan.

21. A device according to claim 18, further comprising one or more solar arrays for supplying electrical power to said fan.

22. A device according to claim 17, wherein the outflow flows downwardly and outwardly from the device, and wherein the at least one airflow generator draws the inflow substantially counter to and adjacent an upper portion of the outflow outside the device such that insects attracted to the outflow and flying along the upper portion thereof towards the at least one outlet opening intersect the inflow and thereby are drawn into the trap by the inflow.

23. A device according to claim 13, wherein the attractant receptacle has at least one adjustable opening, the at least one adjustable opening being selectively adjustable so as to control exposure of the insect attractant, thereby controlling a rate of diffusion of the insect attractant.

24. A device according to claim 23, wherein the heater encircles the supply of the solid or semi-solid diffusible insect attractant.

25. A device according to claim 23, wherein the solid or semi-solid diffusible insect attractant has an internal bore, and wherein the heater is positioned within the internal bore.

26. A device according to claim 23, wherein the heater is a resistance heater.

27. A device according to claim 23, wherein the outflow flows downwardly and outwardly from the device, and wherein the at least one airflow generator draws the inflow substantially counter to and adjacent an upper portion of the outflow outside the device such that insects attracted to the outflow and flying along the upper portion thereof towards the at least one outlet opening intersect the inflow and thereby are drawn into the trap by the inflow.

28. A device according to claim 13, wherein the heater encircles the supply of the solid or semi-solid diffusible insect attractant.

29. A device according to claim 28, wherein the outflow flows downwardly and outwardly from the device, and wherein the at least one airflow generator draws the inflow substantially counter to and adjacent an upper portion of the outflow outside the device such that insects attracted to the outflow and flying along the upper portion thereof towards the at least one outlet opening intersect the inflow and thereby are drawn into the trap by the inflow.

30. A device according to claim 13, wherein the solid or semi-solid diffusible insect attractant has an internal bore, and wherein the heater is positioned within the internal bore.

31. A device according to claim 30, wherein the outflow flows downwardly and outwardly from the device, and wherein the at least one airflow generator draws the inflow substantially counter to and adjacent an upper portion of the outflow outside the device such that insects attracted to the outflow and flying along the upper portion thereof towards the at least one outlet opening intersect the inflow and thereby are drawn into the trap by the inflow.

32. A device according to claim 13, wherein the heater is a resistance heater.

33. A device according to claim 32, wherein the heater encircles the supply of the solid or semi-solid insect attractant.

34. A device according to claim 32, wherein the solid or semi-solid diffusible insect attractant has an internal bore, and wherein the heater is positioned within the internal bore.

35. A device according to claim 13, wherein the outflow flows downwardly and outwardly from the device, and wherein the at least one airflow generator draws the inflow substantially counter to and adjacent an upper portion of the outflow outside the device such that insects attracted to the outflow and flying along the upper portion thereof towards the at least one outlet opening intersect the inflow and thereby are drawn into the trap by the inflow.

36. A device according to claim 12, wherein the outflow flows downwardly and outwardly from the device, and wherein the at least one airflow generator draws the inflow substantially counter to and adjacent an upper portion of the outflow outside the device such that insects attracted to the outflow and flying along the upper portion thereof towards the at least one outlet opening intersect the inflow and thereby are drawn into the trap by the inflow.

37. A method for attracting and capturing flying insects, the method comprising:
  providing a device comprising (a) an insect trap chamber, (b) a supply of a diffusible insect attractant, (c) at least one electrically-powered airflow generator, (d) an attractant receptacle in which the supply of the diffusible insect attractant is received, and (e) an electrically-powered heater disposed proximate the attractant receptacle;
  heating the supply of the diffusible insect attractant above ambient temperature with the electrically-powered heater to facilitate diffusion of the insect attractant;
  generating, with the at least one airflow generator, an outflow flowing outwardly through at least one outflow opening provided on the device and communicated to a surrounding atmosphere, the outflow consisting essentially of ambient air from the surrounding atmosphere with the insect attractant diffused therein from the supply thereof;
  drawing, with the at least one airflow generator, an inflow flowing inwardly through at least one inflow opening and then into the insect trap chamber, the at least one inflow opening being provided on the device and communicated to the surrounding atmosphere, thereby enabling the inflow to draw insects attracted to the device by the insect attractant diffused in the outflow into the insect trap chamber, and
  flowing the outflow through the attractant receptacle for exposure to the insect attractant.

38. A method according to claim 37, wherein the diffusible insect attractant is a solid or semi-solid insect attractant.

39. A method according to claim 38, wherein the insect trap chamber includes a perforated trap having a plurality of perforations and wherein the inflow is drawn through the perforations of the trap, the perforations being sized to enable the inflow to flow therethrough but to prevent passage of the insects therethrough.

40. A method according to claim 38, wherein the attractant receptacle has at least one adjustable opening,
  wherein the method further comprises selectively adjusting the at least one adjustable opening to control exposure of the insect attractant, thereby controlling a rate of diffusion of the insect attractant.

41. A method according to claim 38, wherein the inflow is drawn substantially counter to and adjacent an upper portion of the outflow outside the device such that insects attracted to the outflow and flying along the upper portion towards the at least one outflow opening intersect the inflow and thereby are drawn into the insect trap chamber by the inflow.

42. A method according to claim 37, wherein the inflow is drawn substantially counter to and adjacent an upper portion of the outflow outside the device such that insects attracted to the outflow and flying along the upper portion towards the at least one outflow opening intersect the inflow and thereby are drawn into the insect trap chamber by the inflow.

\* \* \* \* \*